United States Patent Office 3,639,498
Patented Feb. 1, 1972

3,639,498
PREPARATION OF CROSSLINKED ORGANOPOLY-
SILOXANES IN A SUSPENSION MEDIUM
Theodore Vlismas, Barry, Glamorgan, Wales, assignor to
Midland Silicones Limited, Reading, England
No Drawing. Filed June 17, 1968, Ser. No. 737,341
Claims priority, application Great Britain, June 22, 1967,
28,941/67; Feb. 22, 1968, 8,721/68
Int. Cl. C08g 47/02, 53/08
U.S. Cl. 260—825                                    4 Claims

ABSTRACT OF THE DISCLOSURE

Particulate crosslinked organosilicon materials are prepared by reacting in suspension in an inert liquid of an organopolysiloxane containing silicon-bonded olefinically unsaturated groups with a hydrogen substituted organopolysiloxane. Such materials having a microporous structure are suitable as a packing material in the columns of gas chromatographs.

This invention relates to a method for carrying out the chromatographic separation of chemical compounds from mixtures thereof.

Gas chromatography is now widely used as an analytical technique for the separation of mixtures of gaseous or vaporizable chemical substances. According to this technique a quantity of the gaseous mixture is passed with the aid of a carrier gas through a column packed with solid particles which may or may not be coated with a liquid. Each component of the mixture has a particular affinity for a specific packing material or liquid coating which will determine the time for which the component is retained in the column. The differing retention times of the various components in the column enables separation of these components to be achieved. By suitable calibration of the instrument, the components and the relative proportions in which they are present can be determined.

Among the materials which have been employed as the packing for gas chromatographic columns are inorganic powders particularly various forms of kieselguhr having a coating thereon of a stationary phase which is usually a liquid such as a silicone oil, a paraffin oil or a polyethylene glycol. It is also known to employ as the column packing material, porous polystyrene which is effective in the absence of a liquid stationary phase coating.

It is an object of this invention to introduce a novel packing material for gas chromatograph columns. Other objects and advantages of this invention are detailed in or will be apparent from the disclosure and claims which follow.

It has now been discovered that microporous crosslinked organosilicon materials can be readily prepared and surprisingly that such materials are capable of functioning as the column packing material in gas chromatographic separation processes. The organosilicon materials are effective in the absence of an applied liquid stationary phase and of particular utility inasmuch as they can be employed to effect chromatographic separations at temperatures in excess of those which are possible with the known organic materials.

According to this invention, there is provided a method of performing gas chromatographic separations wherein there is employed as the column packing material a particulate cross-linked organosilicon material having a microporous structure.

By the term "microporous structure" we mean a material which is a solid matrix permeated with void spaces of small diameter. Preferably the diameter of at least some of the micropores is of approximately molecular dimensions, that is less than one micron.

Organosilicon materials for use according to this invention can be obtained by effecting the cross-linking of one or more organosilicon polymers under conditions whereby the desired porous structure is obtained either directly or following further processing of the cross-linked product. The organosilicon material can be obtained from any cross-linkable organosilicon polymer. Normally, however, it is preferred to employ organopolysiloxanes, particularly the linear or cyclic organopolysiloxanes, as the cross-linkable organosilicon polymers in view of their general availability and lower cost when compared with, for example, organosilicon polymers containing silethylene or silphenylene linkages in the main polymer chain.

Any of the known reactions for cross-linking organosilicon polymers can be employed in preparing the organosilicon materials for use in this invention. Thus, a linear or cyclic organopolysiloxane containing silicon-bonded hydrogen atoms can be reacted with an organosilicon material containing silicon-bonded olefinic radicals in the presence of a platinum catalyst. Alternatively, the silicon-bonded olefinically unsaturated radicals can be present in the cyclic or linear siloxane and the silicon-bonded hydrogen atoms in the cross-linking compound. Another well-known method of producing cross-linked organosilicon materials comprises reacting a silanol-terminated diorganopolysiloxane with a cross-linking agent in the presence of a condensation catalyst. Suitable cross-linking agents for this reaction include alkylhydrogen polysiloxanes, alkoxy silanes, alkyl orthosilicates and alkyl polysilicates. Suitable catalysts for the cross-linking reaction include acids, bases and the metal salts of carboxylic acids including, for example, stannous octoate, dibutyltin dilaurate, dibutyltin diacetate and lead octoate.

In performing the cross-linking reaction between organosilicon materials containing silicon-bonded hydrogen atoms and silicon-bonded olefinically unsaturated radicals the relative proportions of the reactive atoms and radicals can be chosen to obtain the density of cross-linking in the product consistent with the desired pore size. The cross-linked product obtained in this manner can be used directly, that is after any necessary comminution.

A preferred method of preparing the cross-linked, porous organosilicon material comprises effecting the cross-linking of a linear, or substantially linear, organopolysiloxane in the presence of a non-solvent for the cross-linked product or under conditions whereby such a non-solvent is produced during the cross-linking reaction. According to this technique, one or more liquids become entrapped in the cross-linked material and the subsequent removal of the entrapped liquid endows the product with the required porosity.

In one aspect the preferred method involves effecting the cross-linking of a linear, silanol terminated organopolysiloxane by the addition thereto of an alkoxy silane, an alkyl orthosilicate or an alkyl polysilicate and a condensation catalyst. During the cross-linking reaction an alcohol is produced which is removed from the product, preferably by the application of heat, to leave a residue which is a porous, cross-linked organosilicon material. As hereinbefore indicated such a cross-linking reaction is well known and methods whereby this and equivalent reactions can be performed to obtain porous cross-linked products will be readily ascertainable by those skilled in the art. The preferred alkoxy silane or silicate cross-linking agents are those in which the alkoxy radicals contain less than 5 carbon atoms and the preferred condensation catalysts are the tin salts of carboxylic acids.

In another aspect, the preferred method of preparing the organosilicon material comprises effecting cross-linking of an organosilicon polymer in a suspension medium whereby the porous, cross-linked product can be obtained in the form of fine particles or beads. The medium employed can comprise, for example, a mixture of water and a thickening agent such as carboxymethyl cellulose. When preparing the cross-linked organosilicon material the organosilicon polymer and the cross-linking agent, and, if necessary, a cross-linking catalyst are combined in the medium and the system agitated. The cross-linked product can then be separated from the suspension medium by filtration and treated, for example, by heating to remove water and/or other solvents present in the gel structure. Depending on the degree of agitation employed during the cross-linking reaction, the product can be obtained in the form of substantially spherical particles of a size which permits their use in the chromatographic separation process without the necessity of further comminution. The preparation of porous organic polymeric materials by this general method is known and the techniques applicable to such materials can, in general, be employed in preparing the cross-linked organosilicon products for use in this invention. Thus by suitable variation of the reaction conditions, the physical properties of the product, for example, its surface area per unit weight, can be varied as desired. It may also be advantageous in some cases to incorporate the cross-linkable composition in the aqueous suspension medium as a solution in one or more solvents, for example, a mixture of a hydrocarbon and an alcohol. By suitable choice of the solvent medium the gel-forming phase can be caused to become insoluble in the solvent mixture when it achieves a predetermined molecular weight.

When the cross-linked organosilicon polymer is prepared in a suspension medium it is preferably obtained by the above described process involving the reaction of silicon-bonded hydrogen atoms with silicon-bonded olefinically-unsaturated radicals. Most preferably the cross-linked material is obtained by the reaction of a linear or cyclic organopolysiloxane containing silicon-bonded vinyl radicals with a linear or cyclic organopolysiloxane containing silicon-bonded hydrogen atoms.

Other cross-linking systems can be used in conjunction with the suspension technique, if desired, provided that the suspension medium and thickening agent are substantially inert to the components of cross-linking compositions. In particular the use of an aqueous suspension should be avoided when the cross-linking composition contains readily hydrolyzable radicals such as silicon-bonded alkoxy radicals.

Yet another method which can be employed to obtain the porous organosilicon materials for use in this invention comprises incorporating into a cross-linkable organosilicon composition a soluble finely-divided substance, causing cross-linking of the polymer to take place and, thereafter, leaching out the finely-divided substance with a suitable solvent for the finely-divided substance which is inert to the cross-linked organosilicon polymer. For example, finely-divided calcium carbonate can be incorporated into an organosilicon polymer which is, thereafter, cross-linked to a gel or resin. The cross-linked material is then treated with a liquid, for example, acetic acid, which is capable of removing the calcium carbonate and leaving a residue which is a porous cross-linked, organosilicon material. Finely-divided substances other than calcium carbonate and leaching agents other than acetic acid may, of course, be employed although the preferred finely-divided substances are the acid soluble inorganic oxides and carbonates, the preferred liquids being the weaker acids which can be used to digest the oxides and carbonates. In general the particle size of the finely-divided substance will be selected in accordance with the pore size desired in the organosilicon material. The particular substances used in any given case will, therefore, depend mainly on their availability in the required particle size distribution.

The nature of the organic radicals present in the organosilicon compounds employed in preparing the porous, cross-linked organosilicon material is not critical. In view of their ready availability, we prefer to employ organosilicon compounds in which the silicon-bonded radicals are selected from methyl, vinyl and phenyl radicals. However, the presence of other organic radicals, for example, alkyl radicals such as ethyl, propyl, butyl, decyl and octadecyl radicals, aryl radicals such as diphenyl and tolyl and substituted radicals such as 3,3,3-trifluoropropyl, chloromethyl, bromophenyl, cyanoalkyl radicals and aminoalkyl radicals is not precluded. Depending on the nature of the cross-linking reaction employed it may, in fact, be necessary for a proportion of the silicon-bonded organic radicals to be of the functional type, for example, alkoxy radicals, aminoalkyl radicals, acyloxy radicals or oximo radicals. If desired, the organosilicon polymer may contain silicon-bonded hydrogen atoms or other reactive linkages for participation in the cross-linking reaction.

Methods for preparing porous cross-linked organosilicon materials in a suspension medium as herein described or by the method involving the leaching out of a finely-divided solid also as herein described are novel and are included within the scope of this invention. Also included are the cross-linked porous organosilicon materials prepared by the process.

After preparation and recovery of the porous cross-linked material, it is preferably dried prior to use. If necessary, the cross-linked product can also be reduced to fragments of suitable size for packing the column of the chromatographic apparatus. In common with conventionally employed packing materials, the use of fragments having particle sizes within a narrow range is usually an important factor in achieving the best results. As will be understood by those skilled in chromatographic analysis, the particle size chosen for the column packing material will depend on the flow characteristics desired in the column. For most applications, however, a packing material having a particle diameter within the range from about 10 to about 300 microns is preferred. Use of the cross-linked organopolysiloxane in chromatographic separation according to this invention does not require the application of any special techniques over and above those conventionally employed. There may be used, for example, any suitable carrier gas such as air, nitrogen, argon, helium or hydrogen, and any suitable detection and recording apparatus. If desired, the detection and recording apparatus can be replaced by, or supplemented with, means whereby the separated fractions can be collected and recovered.

The invention is illustrated by the following examples in which the parts are expressed as parts by weight.

EXAMPLE 1

50 ml. of a trimethylsilyl end-stopped copolymer of 95 mol percent dimethylsiloxane units and 5 mol percent of methylhydrogen siloxane units, 2.5 ml. of a mixture of methylvinylsiloxane cyclic tetramer and cyclic trimer and 0.1 ml. of a 20% by weight solution of chloroplatinic acid in isopropyl alcohol were mixed and immediately added to a 600 ml. capacity bottle containing 450 ml. of water having dispersed therein 9 g. of a commercial thickening agent. The bottle and contents were shaken vigorously by hand for five minutes and then immersed in a water bath at 100° C. until swelling of the mixture occurred.

The contents of the bottle were thereafter baked in an oven at 100° C. for 4 hours to ensure that cross-linking of the siloxane was complete. Water was then added to the cooled mixture which separated into two layers. The upper layer was recovered and boiled with 2 N $H_2SO_4$ and then filtered. The solid residue from the filtration step was recovered, boiled with water to remove excess acid, filtered and dried overnight at 100° C.

The resulting product, which was in the form of substantially spherical beads having a diameter within the range from about 100 to 180 microns was used to pack the column of a gas chromatographic apparatus, the column having a length of 2 feet and an internal diameter of 4.8 mm. The packed column was heated to a temperature of 100° C. and maintained at this temperature and samples (1 microliter) of ethanol, isopropanol and benzene introduced at intervals; the carrier gas being helium and the gas flow rate being 50 ml./min. By means of the detector and recorder fitted to the apparatus retention times for the compounds were measured. Expressed relative to benzene the retention times were 0.24 for ethanol and 0.51 for n-propanol.

Calculation of the column efficiency in respect of the benzene peak obtained on the recorder gave a value of 232 theoretical plates.

EXAMPLE 2

196.6 parts of a polydimethylsiloxane, having on average about 15 dimethylsiloxane units in the molecule and containing 6.0 percent by weight of silicon-bonded hydroxyl radicals, was mixed with 19.1 parts of tetraethoxysilane and 2 parts of stannous octoate. The mixture was then heated to 100° C. in a vessel open to the atmosphere until the evolution of ethyl alcohol vapor had apparently ceased. On cooling, the product was obtained as a soft, translucent gel.

The gel obtained was ground with a pestle and mortar and then wet sieved with industrial methylated spirit to obtain the size fraction falling within 44 and 100 mesh (British Standard Sieve). This fraction was then packed into a copper, gas phase chromatographic column approximately 90 cm. long and of internal diameter 4.8 mm., and the column installed on the chromatographic apparatus.

The packed column was then heated to 100° C. and maintained at this temperature and 1 microliter sample of various organic compounds introduced at intervals; the carrier gas being helium and the gas flow rate being 50 ml./min.

The retention times for the organic compounds were measured and were as follows.

| Compound: | Retention time (min.) |
|---|---|
| 2,2,4-trimethylpentane | 5.1 |
| n-Propanol | 2.3 |
| Water | 0.25 |
| Benzene | 4.3 |
| Carbon tetrachloride | 4.5 |
| Cyclohexane | 4.6 |
| Ethanol | 1.4 |

The column efficiency for 2,2,4-trimethylpentane was 120 theoretical plates.

EXAMPLE 3

99 parts of a dimethylpolysiloxane similar to that employed in Example 2 but containing 7.3 percent by weight of silicon-bonded —OH radicals were mixed with 15.4 parts of tetra-isobutoxy-silane and approximately 1 part of stannous octoate. This mixture was then heated to 70° C. until all of the by-produced isobutanol had been driven off. The product was a translucent gel which was reduced to 44–100 mesh size particles by grinding and wet sieving in the manner described in Example 1. After drying, the particulate material was packed into a copper chromatographic column approximately 92 cm. long and 4.8 mm. internal diameter and the packed column installed on the chromatographic apparatus.

Using the flow rate, temperature and sample size employed in Example 1 a column efficiency of 123 theoretical plates was obtained for 2,2,4-trimethylpentane.

EXAMPLE 4

Dimethyldichlorosilane was hydrolyzed by adding to water and the oily hydrolysis product recovered and mixed with methylsilyltrimethylethyl-ketoxime in a proportion of 15 parts for every 100 parts of the hydrolysis product. To the mixture was then added 2 parts of stannous 2-ethylhexoate and the resulting mixture allowed to stand for 2 hours before being heated for 18 hours at 135° C. The product obtained was a firm cross-linked gel which, after grinding and sieving to recover the 44–100 mesh portion, was found to be effective as the stationary phase in gas chromatographic separations.

EXAMPLE 5

When the procedure of Example 4 was repeated employing 1 part of the ketoxime for every 100 parts of the hydrolysis product similar results were obtained.

EXAMPLE 6

100 ml. of a trimethylsilyl end-stopped copolymer of 95 mol percent dimethylsiloxane units and 5 mol percent of methylhydrogensiloxane units, 6 ml. of mixed methylvinyl siloxane cyclic tetramer and cyclic trimer, 20 g. of $CaCO_3$, 15 ml. of toluene and 15 ml. of isopropyl alcohol were mixed with stirring and the mixture heated to 80° C. To the heated mixture was then added 0.2 ml. of a 20% w./v. solution of chloroplatinic acid in isopropyl alcohol. After about 1.5 hours the mixture had been converted to a rubbery gel which was then further heated at 135° C. for 4 hours.

When cool the gel was ground into a particulate material and the calcium carbonate removed from the matrix by treatment with a solution containing equal volumes of acetic acid, isopropyl alcohol and water for several days at about 90 to 100° C. Following this treatment, the gel was washed thoroughly with water and dried. The dried product was effective as the column packing and stationary phase in the separation of organic materials by gas chromatography.

That which is claimed is:

1. A process for producing a particulate crosslinked organosilicon material which comprises forming a suspension in an inert liquid of a composition consisting essentially of (1) an organosilicon polymer containing silicon-bonded olefinically unsaturated groups selected from the group consisting of linear and cyclic organopolysiloxanes wherein the silicon valences not satisfied by olefinically unsaturated groups and Si-O-Si linkages are bonded to alkyl radicals, aryl radicals, cyanoalkyl radicals, aminoalkyl radicals, alkoxy radicals, acyloxy radicals, oximo radicals, 3,3,3-trifluoropropyl, chloromethyl, bromophenyl or hydrogen atoms, (2) an organosilicon material containing silicon-bonded hydrogen atoms selected from the group consisting of linear and cyclic organopolysiloxanes wherein the silicon valences not satisfied by hydrogen atoms and Si-O-Si linkages are bonded to alkyl radicals, aryl radicals, cyanoalkyl radicals, aminoalkyl radicals, alkoxy radicals, acyloxy radicals, 3,3,3-trifluoropropyl radicals, chloromethyl radicals, bromophenyl radicals or oximo radicals, and (3) a catalyst for promoting the reaction between silicon bonded olefinically unsaturated radicals in (1) with silicon-bonded hydrogen atoms in (2), agitating the suspension during at least a portion of the reaction between (1) and (2) and thereafter recovering the solid product.

2. A process as claimed in claim 1 wherein the organosilicon polymer (1) is a cyclic methylvinylsiloxane.

3. A process as claimed in claim 1 wherein the organosilicon material (2) is a methylhydrogenpolysiloxane.

4. A process as claimed in claim 1 wherein the catalyst (3) is a platinum metal or a compound or complex of a platinum metal.

References Cited
UNITED STATES PATENTS

| | | | |
|---|---|---|---|
| 2,823,218 | 2/1958 | Speier et al. | 260—825 |
| 2,965,593 | 12/1960 | Dietz | 260—827 |
| 3,159,601 | 12/1964 | Ashby | 260—825 |
| 3,347,020 | 10/1967 | Van Venrooy | 55—67 |
| 3,357,158 | 12/1967 | Hollis | 55—67 |

SAMUEL H. BLECH, Primary Examiner

U.S. Cl. X.R.

55—67; 260—2.5 S, 2.5 M, 18 S, 46.5 UA, 448.2 E